Figure 1:
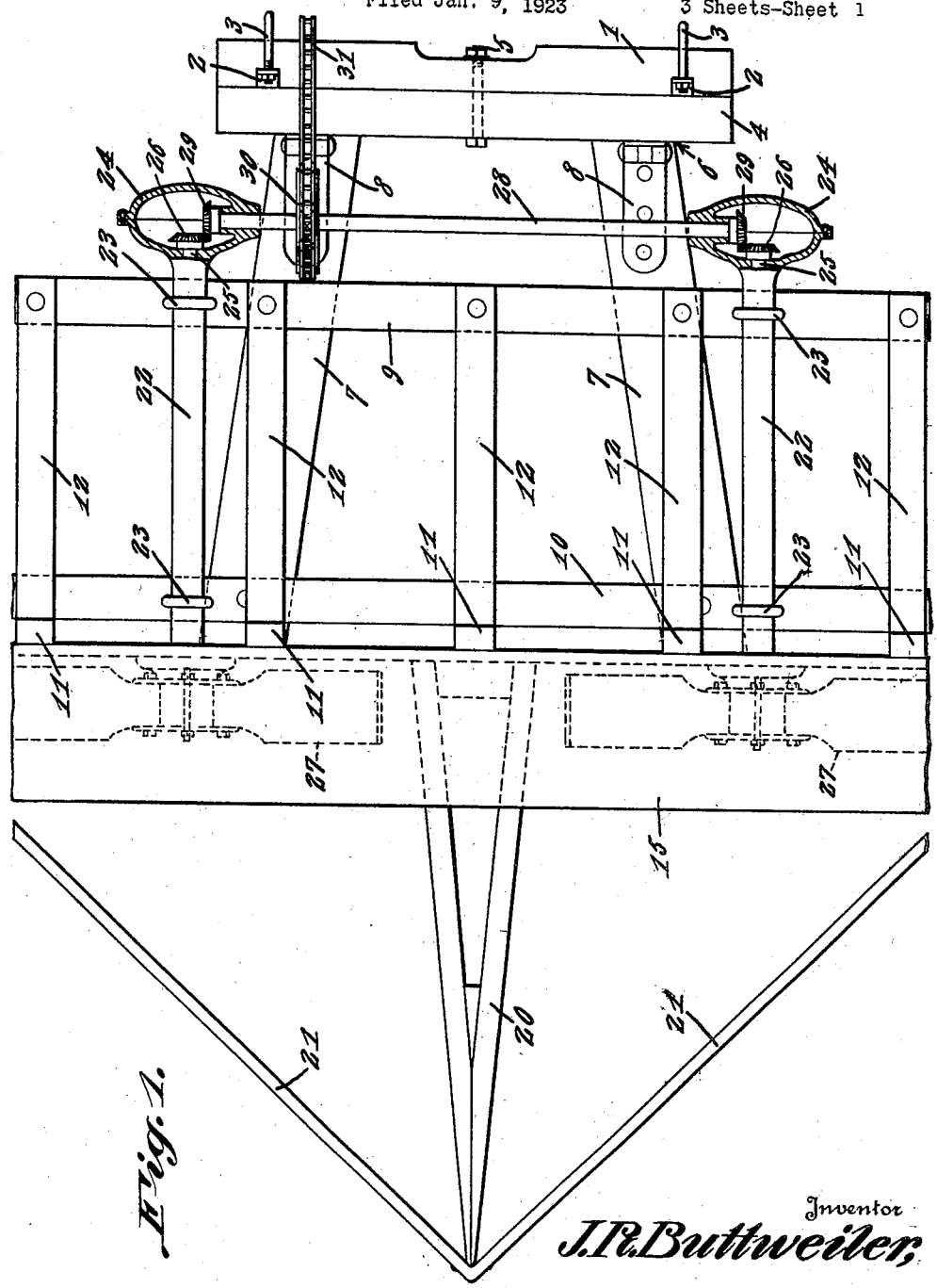

Dec. 30, 1924.

J. R. BUTTWEILER

SNOWPLOW

Filed Jan. 9, 1923

1,521,172

3 Sheets-Sheet 1

Inventor
J. R. Buttweiler,
By C. A. Snow & Co.
Attorney

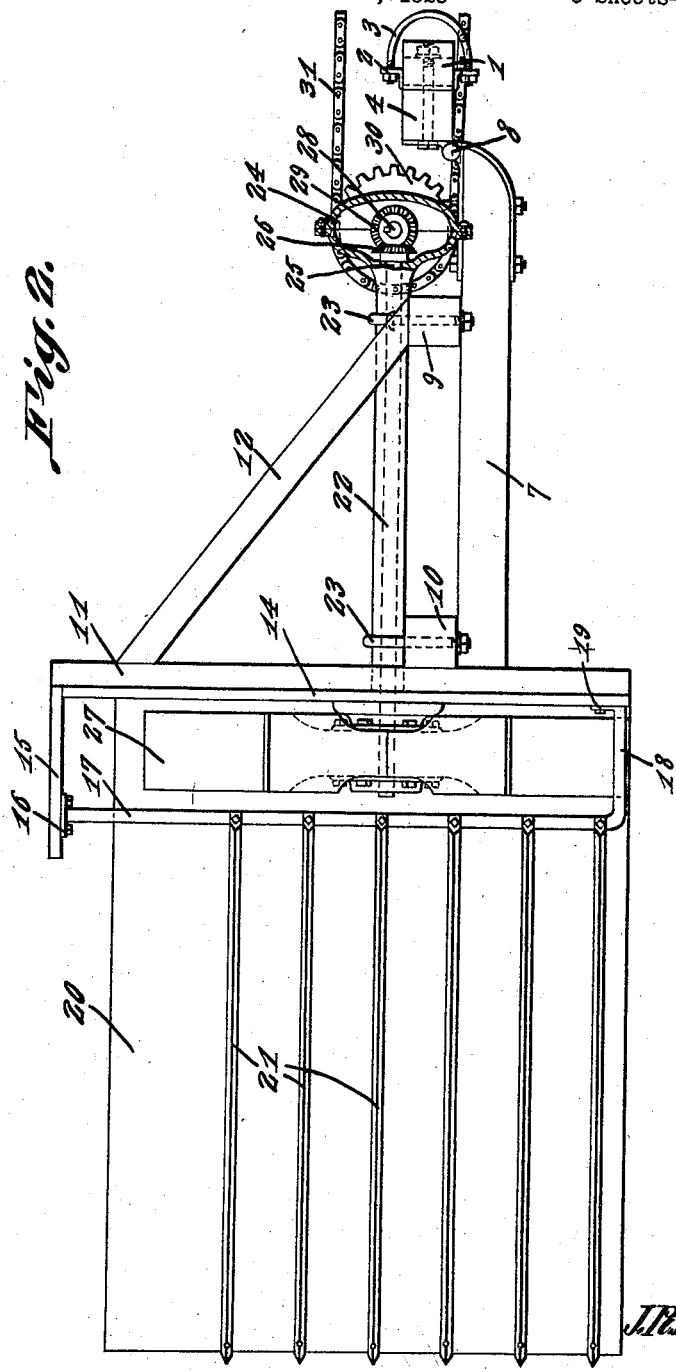

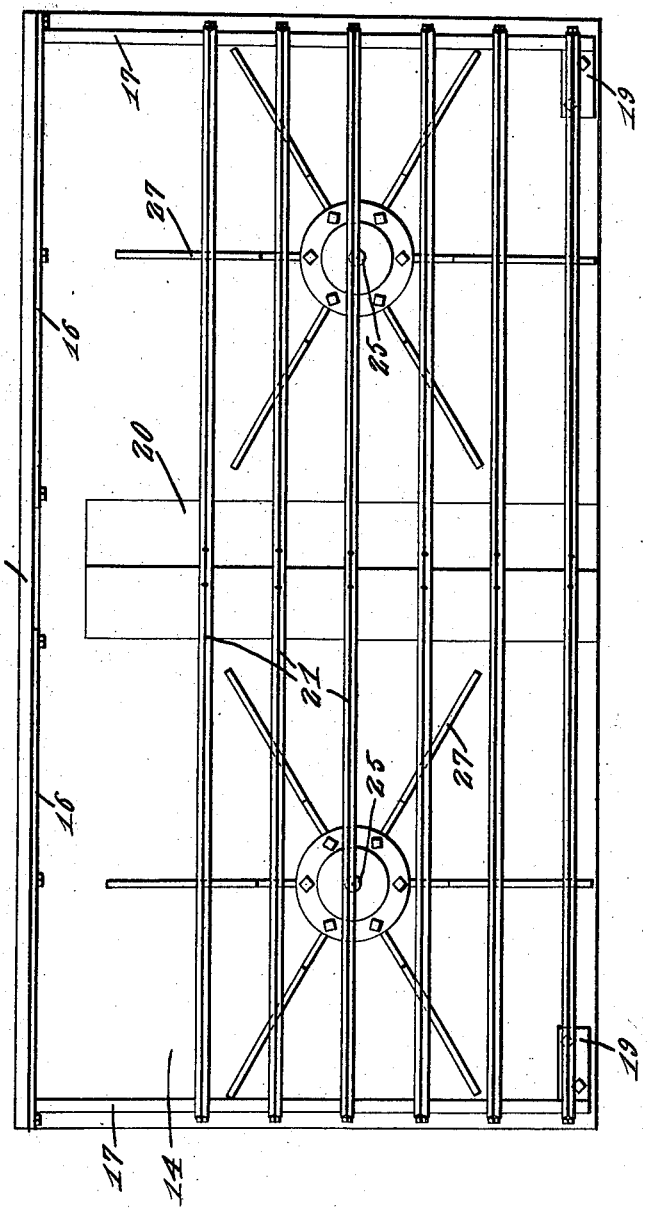

Patented Dec. 30, 1924.

1,521,172

UNITED STATES PATENT OFFICE.

JOHN R. BUTTWEILER, OF FREEPORT, MINNESOTA.

SNOWPLOW.

Application filed January 9, 1923. Serial No. 611,628.

*To all whom it may concern:*

Be it known that I, JOHN R. BUTTWEILER, a citizen of the United States, residing at Freeport, in the county of Stearns and State of Minnesota, have invented a new and useful Snowplow, of which the following is a specification.

This invention aims to provide a simple means, adapted to be attached to a tractor or like motor propelled vehicle, for clearing the snow from a highway.

The invention aims to provide novel means for operating the movable parts of the structure, to provide novel means for breaking up the snow before the snow is engaged by the rotary elements which cast the snow laterally and, generally, to improve and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a side elevation; Figure 3 is a front elevation.

In carrying out the invention there is provided a support 1 which may be in the form of a beam, provided with any suitable means, such as yokes and U-bolts 3, whereby the support may be connected to the forward axle of a tractor or other motor propelled vehicle. The numeral 4 marks a carrier which may be a beam, located in front of the support 1 and connected thereto by a pivot element 5 for swinging movement about an axis parallel to the line of advance of the device. The numeral 6 designates a frame, including forwardly diverging sills 7 connected by hinges 8 to the carrier 4 for vertical swinging movement. A rear cross member 9 and a forward cross member 10 are connected to the sills 7. Uprights 11 are secured to the forward cross member 10 and extend above and below the sills, 7 as shown in Figure 2. Inclined braces 12 connect the uprights 11 with the rear cross member 9. The frame 6 embodies a vertical wall 14 carried by the uprights 11. A hood 15 extends forwardly from the upper edge of the wall 14. Reinforcing strips 16 are secured to the lower surface of the hood 15. The upper ends of brackets 17 are connected with the strips 16, the brackets being disposed parallel to the wall 14. The brackets 17 have rearwardly extended ends 18 provided with inwardly prolonged foot plates 19 attached to the wall 14. A V-shaped plow 20 is mounted at its rear end on the wall 14. Knives 21 are provided, the knives being vertically spaced. The apices of the knives are secured to forward end of the plow 20, the rear ends of the arms of the knives 21 being carried by the brackets 17.

Tubular bearings 22 extend parallel to the line of advance of the machine and are secured at 23 to the members 9 and 10 of the frame 6. At their rear ends, the bearings 22 carry casings 24. Driven shafts 25 are journaled in the bearings 22. Rotary deflectors 26 are mounted on the forward ends of the shafts 25 and are located in advance of the wall 14, beneath the hood 15. The deflectors 26 comprise blades 27 of any desired construction. A transverse drive shaft 28 is journaled in the casings 24. Beveled pinions 29, located in the casings 24, form an operative connection between the driven shafts 25 and the drive shaft 28. Rotation may be imparted in any desired way to the drive shaft 28. If desired, the drive shaft may be provided with a sprocket wheel 30 cooperating with a sprocket chain 31. The sprocket chain 31 or its equivalent, constitutes means whereby rotation may be imparted to the deflectors 26 from the engine on the vehicle whereunto the device forming the subject matter of this application is connected and upon which it is carried.

The knives 21 sever the snow into horizontal slices, an operation which is peculiarly desirable, if the drifts are high and if the snow is packed hard. The plow 20 divides the snow and carries the snow into the field of operation of the deflectors 26. The deflectors 26 cast the snow laterally off the highway. Rotation is imparted to the deflectors 26 by the shafts 25, the intermeshing beveled pinions 29, the drive shaft 28, and the sprocket wheel 30 together with the chain 31, or through the instrumentality of any mechanism which is substituted for the sprocket wheel and the chain.

The frame 6 can swing about an axis parallel to the line of advance of the machine, because the carrier 4 is connected to the support 1 by the pivot element 5. Further, the frame 6 can swing vertically, because the sills 7 are hinged at 8 to the carrier 4. The general construction of the device, is such that it will accommodate itself readily to irregularities in the surface of the highway which is being cleared of snow.

It is to be observed that the rear ends of the knives 21 are connected to the brackets 17, and that the brackets 17 are located in advance of the rotary deflectors 26, shown clearly in Figure 2. Consequently, when the snow is cast laterally by the deflectors 26, the knives 21 in no wise interfere with the lateral movement of the snow.

What is claimed is:—

1. A device of the class described, comprising a support; a carrier mounted on the support for tilting movement on an axis parallel to the line of advance; a frame hinged to the carrier for vertical swinging movement; rotary deflectors journaled on the frame; and a plow carried by the frame and located between the deflectors.

2. In a device of the class described, a frame, a substantially vertical wall carried by the frame, a hood extended forwardly from the upper edge of the wall, a plow mounted at its rear end on the wall, rotary deflectors supported for rotation on opposite sides of the plow, brackets connected at their upper ends to the hood, and connected at their rear ends to the wall, the brackets comprising substantially vertical portions spaced from the wall, so that the deflectors can cast the snow laterally, between the vertical portions of the brackets and the wall, and vertically spaced knives connected at their forward ends to the forward end of the plow, the rear ends of the knives being connected to the brackets, and the side portions of the knives being spaced from the side portions of the plow.

In testimony that I claim the foregoing as my own, I have hereto affixed my signature in the presence of two witnesses.

JOHN R. BUTTWEILER.

Witnesses:
HENRY WOEBKENBERG,
JOSEPH FORREN.